United States Patent
Kay et al.

[11] 3,744,876
[45] July 10, 1973

[54] OPTICAL DEVICE FOR TRANSFORMATION OF POLARIZATION

[76] Inventors: Richard B. Kay, 1807 Midlothion Court, Vienna, Va.; Richard J. Holland, 2231 Hall Place, N.W., Washington, D.C.

[22] Filed: July 2, 1971

[21] Appl. No.: 159,373

[52] U.S. Cl. ............................................. 350/157
[51] Int. Cl. ........................................... G02b 27/28
[58] Field of Search.................... 350/147, 152, 157; 356/100

[56] References Cited
UNITED STATES PATENTS
3,069,967 12/1962 White et al. ........................ 356/100
3,433,553 3/1969 Peters ................................. 350/147

OTHER PUBLICATIONS
Hughes, "Modified Prism for Spectral Polarization Studies" Rev. Sci. Instr. Vol. 31, No. 10, (Oct. 1960), pp. 1156–1157.
Billings, "A Monochromatic DePolarizer" J. Opt. Soc. Am., Vol. 41, No. 12, (Dec. 1951), pp. 966–975.
Peters, "Light Depolarizer" App. Opt., Vol. 3, No. 12, (Dec. 1964), pp. 1502–1503.

*Primary Examiner*—John K. Corbin
*Attorney*—Harry M. Saragovitz et al.

[57] ABSTRACT

Passive optical apparatus which produces a plane polarized transmitted beam, proportional in intensity to the incident beam, and independent of the polarization of the incident beam is disclosed. The transmitted beam is always attenuated by a factor of one-half, and the apparatus works equally well with monochromatic or white light. The apparatus which includes a pseudo depolarizer followed by a plane polarizer is particularly suited for utilization with polarization sensitive instruments such as monochromators and spectrometers.

6 Claims, 2 Drawing Figures

INVENTOR:
RICHARD B. KAY
RICHARD J. HOLLAND
BY Harry M. Saragovitz
Edward J. Kelly
Herbert Berl
Saul Elbaum ATTORNEY

OPTICAL DEVICE FOR TRANSFORMATION OF POLARIZATION

The invention described herein may be manufactured, used, and licensed by or for the Government for Governmental purposes without the payment to us of any royalties thereon.

BACKGROUND OF THE INVENTION

This invention relates to optical polarization and more specifically to a passive optical system that will produce an attenuated, plane polarized beam from any variously polarized beam incident on the system.

The sensitivity of many optical instruments depends upon the polarization of the radiation being analyzed. Monochromators and spectrometers are particularly polarization-sensitive, whether they be grating or prism instruments.

Various different systems have been devised to depolarize monochromatic light. Generally these systems use active elements. The use of an active element to depolarize monochromatic light is taught for example by Bruce H. Billings in the "Journal of the Optical Society of America," Vol. 41, Page 966 (1951).

Instead of active elements, the apparatus of this invention provides a device composed of simple passive elements. The transmitted beam will always be an attenuated, plane-polarized beam regardless of the polarization of the incident beam. Thus, it is apparent that the invention has generally utility in the field of optics. In addition, it should be obvious that the invention also has utility in any field where the intensity of polarized radiation is of interest. For example, in the field of atomic collision physics the absolute atomic level populations are determined by the intensity of atomic de-excitation radiation. This radiation is often polarized. With the apparatus of this invention this de-excitation radiation can be readily measured.

SUMMARY OF THE INVENTION

The apparatus of this invention basically comprises a pseudo depolarizer, which may be made from quartz for example and a plane polarizer. Of course, collimating and focusing lenses will also generally be used in the entire optic system of the invention.

The pseudo depolarizer has its fast axis cut diagonally across the face of a wedge shaped element. The plane polarizer follows the pseudo depolarizer in the optical path and has its transmission axis set at an angle of 45° with respect to the fast axis of the pseudo depolarizer.

The measuring instrument utilized follows the plane polarizer in the optical path. With this arrangement, the light transmitted to the measuring instrument from the plane polarizer will always be a plane polarized beam having an intensity of one-half that of the source light regardless of the polarization of the source light.

It is therefore an object of this invention to provide an attenuated, plane polarized beam.

It is a further object of this invention to provide an optical system that will transmit an attenuated, plane polarized beam from any variously polarized incident beam.

It is another object of this invention to provide a system for accurate intensity measurements with polarization sensitive instruments.

It is still another object of this invention to provide a system for measuring the intensity of atomic de-excitation radiation.

It is still a further object of this invention to provide a transmitted light beam whose intensity is independent of the polarization of the incident radiation.

BRIEF DESCRIPTION OF THE DRAWING

The above-mentioned and other objects of the invention will become readily apparent from the following detailed description of the invention when read in conjunction with the annexed drawing in which.

DESCRIPTION OF THE INVENTION

Figure 1:
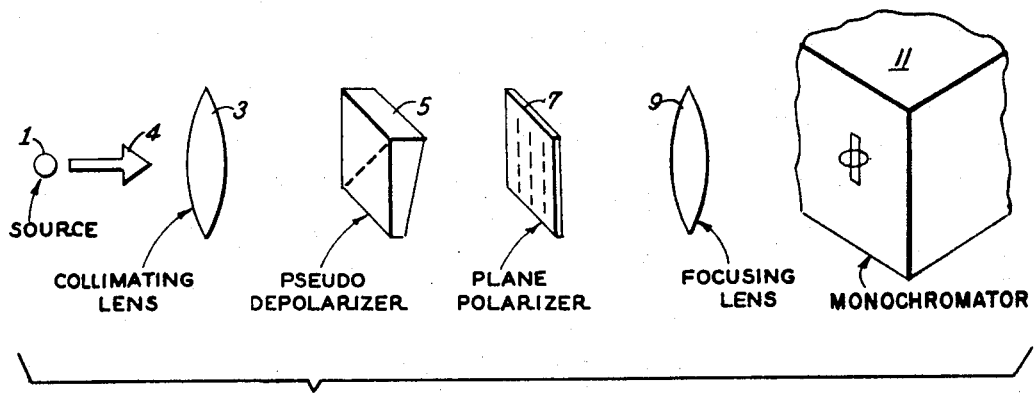
FIG. 1 is a schematic representation of a typical application of the invention.

FIG. 1 shows a typical application of the invention. The apparatus of FIG. 1 comprises in order in the direction of travel of the light beam as indicated by the arrow 4: a source 1, a collimating lens 3, a pseudo depolarizer 5, a plane polarizer 7, a focusing lens 9 and a polarization sensitive instrument 11. Source 1 can be any source of polarized radiation. Collimating lens 3 is of course a well known optical device used to obtain parallel rays from source 1.

Pseudo depolarizer 5 is in effect a general retarder of uniformly changing thickness. It is generally used to produce circularly and elliptically polarized forms. In such systems the pseudo depolarizer follows plane polarizers. This type of system is disclosed in an article by R. H. Hughes, "Review of Scientific Instruments," Vol. 31, Page 1156 (1960) and in other publications. Thus, pseudo depolarizers are well known in the art and are available on the market today. However, in all cases known by the Applicants the pseudo depolarizers are used following plane polarizers to obtain various circularly and elliptically polarized forms as mentioned above. From FIG. 1 it is quite obvious that this invention uses pseudo depolarizers in an entirely different manner.

Plane polarizer 7 is a conventional optical device, but as will be apparent later the transmission axis of plane polarizer 7 is oriented at a particular angle with respect to the fast axis of pseudo depolarizer 5. A conventional focusing lens 9 follows plane polarizer 7. Focusing lens 9 is used to focus the light from plane polarizer 7 on the slit of instrument 11 which typically could be a monochromator.

Figure 2:
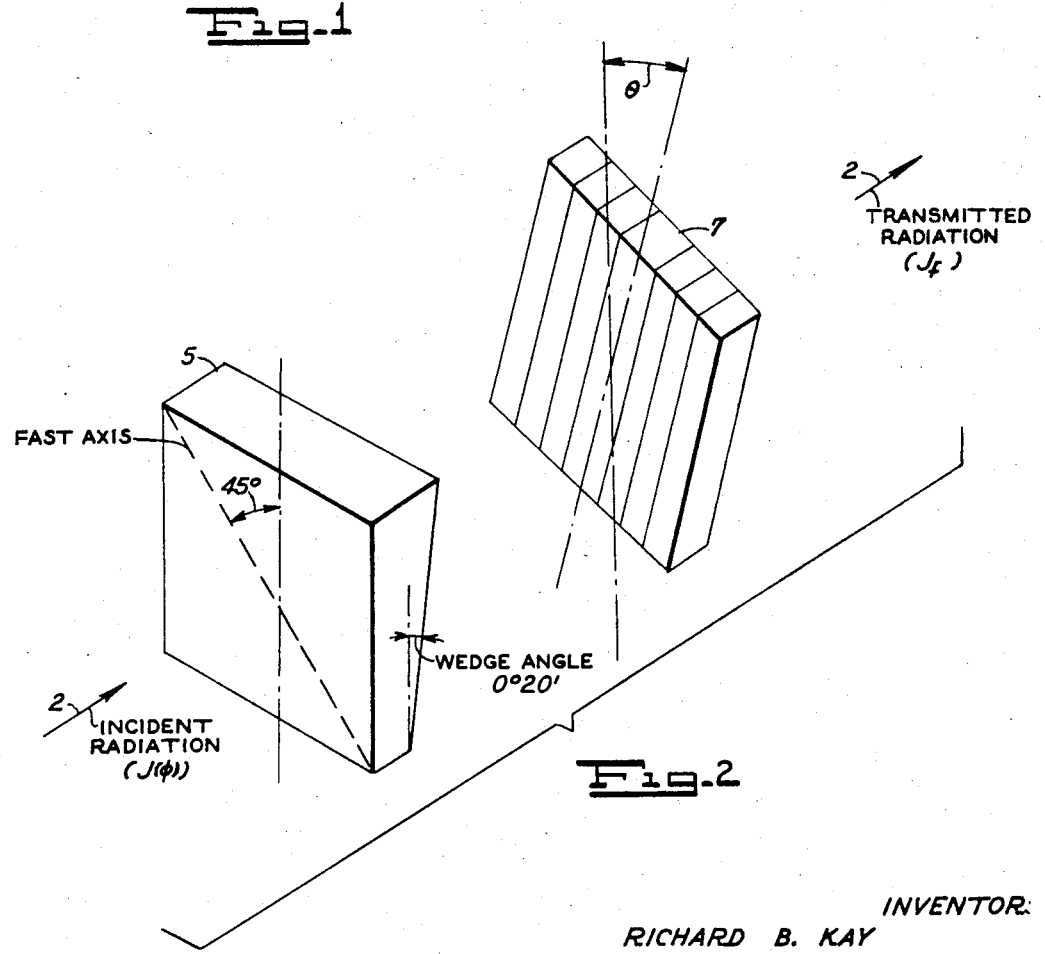
FIG. 2 is a detailed representation of the pseudo depolarizer and plane polarizer of the invention.

FIG. 2 shows pseudo depolarizer and plane polarizer 7 in detail. As shown in FIG. 2, pseudo depolarizer 5 is a wedge shaped element having a wedge angle of 0° 20' and its fast axis cut diagonally across the face of the element which is, of course, at an angle of 45° with the vertical as shown in FIG. 2. Plane polarizer 7 follows depolarizer 5 in the optical path, the direction of light travel being indicated by the arrows 2. For reasons that will be apparent latter the transmission axis of plane polarizer 7 is set at an angle of 45° with respect to the fast axis of depolarizer 5 in a system such as shown in FIG. 1. In FIG. 2 setting the transmission axis of polarizer 7 at 45° with respect to the fast axis of depolarizer 5 would result in an angle $\theta$ of zero degrees which as will be apparent later is the proper value for $\theta$.

In FIG. 2 the incident radiation is shown as $J(\phi)$ and the transmitted radiation, that is the output from plane polarizer 7, is shown as $J_f$. Considering again the typical arrangement shown in FIG. 1, the incident radiation, that is the light from source 1 which is a polarized light, is collimated by lens 3, passes through pseudo depolarizer 5 and then plane polarizer 7. The output $J_f$ from plane polarizer 7 is plane polarized radiation that has an intensity one-half as great as the intensity of the incident radiation $J(\phi)$. This attenuated plane polarized radiation is then focused on the slit of instrument 11 by lens 9.

With the arrangement of FIG. 1 (transmission axis of plane polarizer 7 at 45° with respect to the fast axis of pseudo depolarizer 5) the transmitted radiation $J_f$ will always be plane polarized and have an intensity of one-half that of incident radiation $J\phi$. This can be mathematically verified using Jones matrices.

Since the wedge angle of pseudo depolarizer 5 is 20 minutes, optical path differences between ordinary and extraordinary rays may range from zero to several wavelengths, depending upon the physical path taken through the wedge and the frequency of the light. For a given monochromatic component, one may use the matrix for a general retarder to describe a certain set of optical paths through pseudo depolarizer 5. Averaging over all possible paths is then the effect obtained by the wedge. Considering pseudo depolarizer 5 and polarizer 7 as an instrument having an instrument function I, one forms the instrument function from a general retarder with the fast axis at 45° to the vertical, $$I_{G.R.}^{45°}(\delta) = \begin{pmatrix} \cos(\delta/2) & i\sin(\delta/2) \\ i\sin(\delta/2) & \cos(\delta/2) \end{pmatrix}, \quad (1)$$

(where $\delta$ is the phase between the extraordinary and ordinary monochromatic components); and a linear polarizer with transmission axis at an angle $\theta$ with respect to the vertical;

$$I_{L.P.}(\theta) = \begin{pmatrix} \cos^2(\theta) & \cos(\theta)\sin(\theta) \\ \cos(\theta)\sin(\theta) & \sin^2(\theta) \end{pmatrix} \quad (2)$$

The instrument function is, then, $$I(\delta, \theta) = I_{L.P.}(\theta) \cdot I_{G.R.}^{45°}(\delta). \quad (3)$$

With $\theta$ at 0°, (the transmission axis of polarizer 7 vertical and hence at 45° with respect to the fast axis of depolarizer 5), the instrument matrix reduces to $$I(\delta, 0°) = \begin{pmatrix} \cos(\delta/2) & i\sin(\delta/2) \\ 0 & 0 \end{pmatrix}. \quad (4)$$

Now, for the incident beam $J(\phi)$, take the most general Jones vector for monochromatic light, namely $$J_i(\phi, \gamma) = \begin{pmatrix} \cos(\phi)\, e^{i(\gamma/2)} \\ \sin(\phi)\, e^{i(\gamma/2)} \end{pmatrix}. \quad (5)$$

which allows for a phase of $\gamma$ between the vertical and horizontal components, of amplitude $\cos(\phi)$ and $\sin(\phi)$. The above Jones vector is normalized so that $J^*_i J_i = 1$. Application of the instrument I ($\delta, 0°$) to $J_i$ produces the transmitted beam with a final Jones vector $J_f$. Thus, $J_f = I(\delta, 0°) \cdot J_i(\phi, \gamma) =$ $$\begin{pmatrix} \cos(\delta/2)\cos(\phi)\, e^{-i(\gamma/2)} + i\sin(\delta/2)\sin(\phi)\, e^{i(\gamma/2)} \\ 0 \end{pmatrix},$$

so that (6)

$$J^*_f J_f = \cos^2(\delta/2)\cos^2(\phi) + \sin^2(\delta/2)\sin^2(\phi)$$
$$-2\cos(\delta/2)\sin(\delta/2)\cos(\phi)\sin(\phi)\sin(\gamma).$$

(7)

Now to take into account the effect of the wedge, average $J^*_f J_f$ over all retardation angles $\delta$. As $<\sin^2(\delta/2)> = <\cos^2(\delta/2)> = \frac{1}{2}$, and as $<\cos(\delta/2)\sin(\delta/2)> = 0$, we find $$<J^*_f J_f> = (\frac{1}{2})\cos^2(\phi) + (\frac{1}{2})\sin^2(\phi) = \frac{1}{2}.$$

(8)

Thus, regardless of the initial state of polarization of the source light form, the final form is plane polarized and half the average intensity of the original. The averaging that results in equation (8) above is over the area of the beam and assumes that several cycles of $\delta$ are present within the extent of the beam cross section.

In addition to mathematically proving the invention Applicants constructed and tested the invention. The results of the tests clearly showed that a variable retarder (pseudo depolarizer 5) and then a polarizer (plane polarizer 7) with transmission axis at 45° to the fast axis of the retarder is effective in producing an attentuated transmitted beam whose intensity is independent of the state of polarization of the incident beam.

In addition to proving the invention certain tests carried out by the Applicants pointed out that wedge angles somewhat steeper than 20 minutes are preferable. Thus, while FIG. 2 specifically shows a wedge angle of 20 minutes, wedge angles of 20 minutes to 3° may be used. In fact the steeper wedge angles may be preferable. Examples of pseudo polarizers that give excellent results are a quartz depolarizer with a wedge angle of 3° and a calcite depolarizer having a wedge angle of 1°. These specific examples are given not as limitations but to point out that the pseudo depolarizer can be made of any suitable material and that the specific wedge angle shown in FIG. 2 is not critical.

While the invention has been described with reference to a specific embodiment, it will be apparent to those skilled in the art that various changes and modifications, in addition to those set forth, can be made to the specific embodiment shown and described without departing from the spirit and scope of the invention as set forth in the claims. For example, the wedge angle is not critical and can range from greater than zero degrees to about 5°.

What is claimed is:

1. Apparatus composed of passive elements for providing plane polarized radiation whose intensity is independent of the polarization of the incident radiation comprising: a pseudo depolarizer in the form of a wedge having the fast axis cut diagonally across its face, said pseudo depolarizer being placed in the path of travel of said incident radiation and a plane polarizer placed in the path of travel of the radiation emanating from said pseudo depolarizer and so positioned that its transmission axis is at 45° with respect to said fast axis of said pseudo depolarizer.

2. The apparatus as defined in claim 1 wherein the specific angle of said fast axis of said pseudo depolarizer with respect to the vertical axis thereof is 45°.

3. The apparatus as defined in claim 1 wherein said pseudo depolarizer has a wedge angle ranging between 20 minutes and 3°.

4. The apparatus as defined in claim 1 wherein said pseudo depolarizer is made of quartz and has a wedge angle of 3°.

5. The apparatus as defined in claim 1 wherein said pseudo depolarizer is made of calcite and has a wedge angle of 1°.

6. A system for measuring the intensity of polarized radiation with a polarization sensitive instrument comprising:
- a source of polarized radiation;
- a collimating lens placed in the path of travel of said polarized radiation;
- a passive wedge-shaped pseudo depolarizer cut to have the fast axis diagonally across its face, said pseudo depolarizer being positioned to receive radiation emanating from said collimating lens;
- a plane polarizer placed to receive radiation emanating from said pseudo depolarizer and so positioned that its transmission axis is at an angle of 45 degrees with respect to said fast axis of said pseudo depolarizer;
- a polarization sensitive instrument; and
- a focusing lens so positioned as to focus the radiation emanating from said plane polarizer on said polarization sensitive instrument.

* * * * *